(12) United States Patent
Arcella et al.

(10) Patent No.: US 6,605,795 B1
(45) Date of Patent: Aug. 12, 2003

(54) CONTROL SYSTEM FOR DEPOSITING POWDER TO A MOLTEN PUDDLE

(75) Inventors: Frank G. Arcella, Eden Prairie, MN (US); Bradley A. Cleveland, Plymouth, MN (US); Mark S. Fullen, St. Paul, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 09/707,186

(22) Filed: Nov. 6, 2000

Related U.S. Application Data

(60) Provisional application No. 60/163,548, filed on Nov. 4, 1999, and provisional application No. 60/163,643, filed on Nov. 4, 1999.

(51) Int. Cl.⁷ ............................................. B23K 26/00
(52) U.S. Cl. ........................... 219/121.63; 219/121.65
(58) Field of Search .................. 219/121.63, 121.64, 219/121, 65, 121.66, 121.85

(56) References Cited

U.S. PATENT DOCUMENTS

| | | | |
|---|---|---|---|
| 4,532,408 A | * | 7/1985 | Richardson ............ 219/130.01 |
| 4,575,330 A | | 3/1986 | Hull ...................... 425/174.4 |
| 4,613,743 A | | 9/1986 | Nied et al. ............. 219/130.21 |
| 5,121,329 A | | 6/1992 | Crump ....................... 364/468 |
| 5,303,141 A | | 4/1994 | Batchelder et al. ......... 364/149 |
| 5,396,333 A | * | 3/1995 | Aleshin et al. ............. 356/385 |
| 5,481,085 A | * | 1/1996 | Kovacevic et al. .... 219/130.01 |
| 5,649,277 A | | 7/1997 | Greul et al. .................... 419/2 |
| 5,717,599 A | | 2/1998 | Menhennett et al. .. 364/468.25 |
| 5,745,834 A | | 4/1998 | Bampton et al. ............. 419/37 |
| 5,837,960 A | | 11/1998 | Lewis et al. ............ 219/212.63 |
| 5,961,861 A | | 10/1999 | McCay et al. ......... 219/121.86 |
| 6,122,564 A | * | 9/2000 | Koch et al. .................. 700/123 |
| RE36,926 E | | 10/2000 | Austin et al. .......... 219/130.21 |

FOREIGN PATENT DOCUMENTS

WO            WO 97/04914            2/1997

\* cited by examiner

*Primary Examiner*—M. Alexandra Elve
(74) *Attorney, Agent, or Firm*—Westman, Champlin & Kelly, P.A.

(57) ABSTRACT

An imaging system for controlling powder aiming in a molten puddle. In the imaging system of the present invention, an image processor extracts a first image of the molten puddle and a second image of a powder envelope from a composite image of the weld area. The first and second processed images provide feedback for process control.

27 Claims, 11 Drawing Sheets

CONTROL SYSTEM FOR DEPOSITING POWDER TO A MOLTEN PUDDLE

CROSS REFERENCE TO RELATED TO RELATED APPLICATIONS

This application claims priority to Provisional Application Ser. No. 60/163,548 filed Nov. 4, 1999 and entitled "CONTROL SYSTEM FOR DEPOSITING POWDER FOR LASER WELDING APPLICATIONS", and Provisional Application Ser. No. 60/163,643 filed Nov. 4, 1999 and entitled "POSITION CONTROL SYSTEM FOR DEPOSITING POWDER FOR LASER WELDING APPLICATIONS".

The Government may have certain rights to this invention under a Cooperative Research and Development Agreement (CRADA)

BACKGROUND OF THE INVENTION

The present invention relates to a control system for welding applications. In particular, the present invention relates to a control system for depositing powder in a molten puddle.

Welding applications use an energy source or laser to melt a molten puddle. For deposition welding, layers of a weld material or powder are deposited into the molten puddle to form three-dimensional objects. Powder is dispersed from a nozzle which is aimed to deposit the powder into the molten puddle. The molten puddle cools to solidify the fused powder to form the three-dimensional object. For optimum operation, it is desirable to accurately aim the powder dispersed from the nozzle so that all of the powder is deposited to a desired location(s) in the molten puddle. Powder deposited outside the molten puddle or improperly can have certain deleterious effects on the metallurgical properties and performance of the resulting structure as well as increased costs.

Various variables can affect powder aiming or deposit to the molten puddle, including nozzle or laser standoff from the workpiece and feed parameters for powder dispersed from the nozzle. During operation, the position of the laser or nozzle can shift or other parameters can vary as a result of the high operating temperatures. Variations in the operating parameters can affect aiming of the powder into the molten puddle.

In prior applications, the weld area is visually inspected to assure accurate deposit of the powder into the molten puddle. However, such visual inspection is not systematically controlled. Prior systems which provide size and dimension control of the puddle based upon a puddle image do not provide a complete control solution for accurately aiming powder into the molten puddle. The present invention addresses these and other problems and provides solutions not recognized nor taught by the prior art.

SUMMARY OF THE INVENTION

The present invention relates to an imaging system for controlling powder aiming into a molten puddle. In the imaging system of the present invention, an image processor extracts a first image of the molten puddle and a second image of a powder envelope from a captured image of the weld area. The first and second processed images provide feedback for process control.

DETAILED DESCRIPTION OF THE PREFERRED EMBODIMENTS

Figure 1:
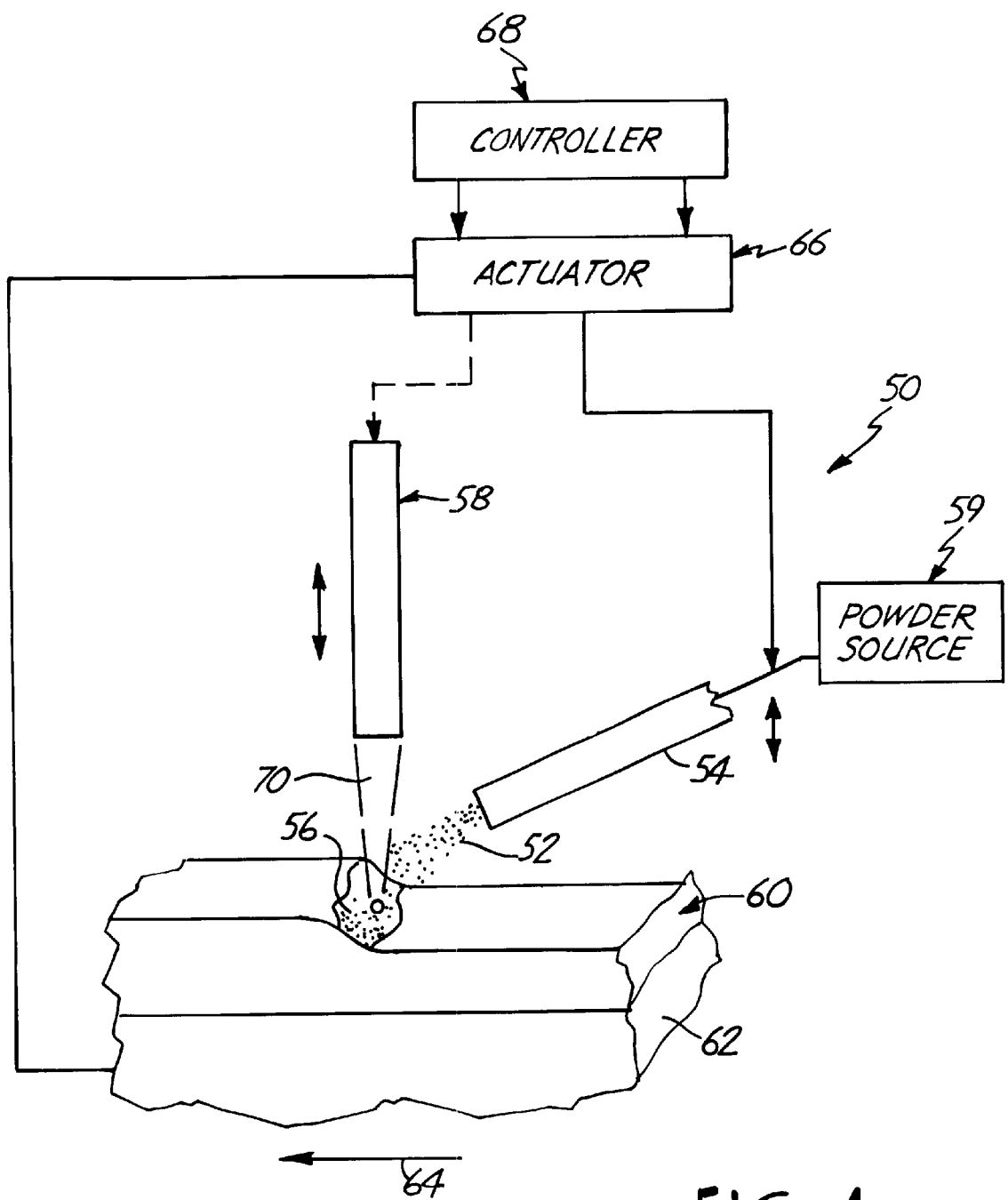
FIG. 1 is a schematic illustration of an embodiment of a deposition welding operation.

FIG. 1 schematically illustrates an embodiment of a welding apparatus 50 for deposition welding. As illustrated a flowable welding material 52, such as a titanium powder or other metal powder or material mixture is dispersed from a nozzle 54 to a molten puddle 56. The molten puddle 56 is heated from an energy power source or laser 58 to melt the weld powder 52. Powder is fed to nozzle 54 from a powder or weld material source 59. Multiple layers of powder are deposited to a workpiece 60 to fabricate components of various shapes and sizes via direct metal deposition.

As shown in FIG. 1, table 62 movably supports the workpiece 60 as illustrated by arrow 64. The table 62 is moved to deposit material or powder in a predetermined pattern to form complex three-dimensional objects or parts. Alternatively, the laser 58 and nozzle 54 can move relative to the table 62 and workpiece 60 to deposit powder in a predetermined pattern as described.

For deposition welding, after each layer is formed, the nozzle 54 and laser 58 are indexed or raised a distance corresponding to the thickness of the deposited layer to maintain the elevation or standoff distance of the laser 58 and nozzle 54 from the workpiece. As shown schematically, the nozzle 54 and laser 58 are operated by actuator 66 to provide desired standoff of the laser 58 and nozzle 54 and movement of the table 62 based upon control or operating commands generated by controller 68.

Figure 2:
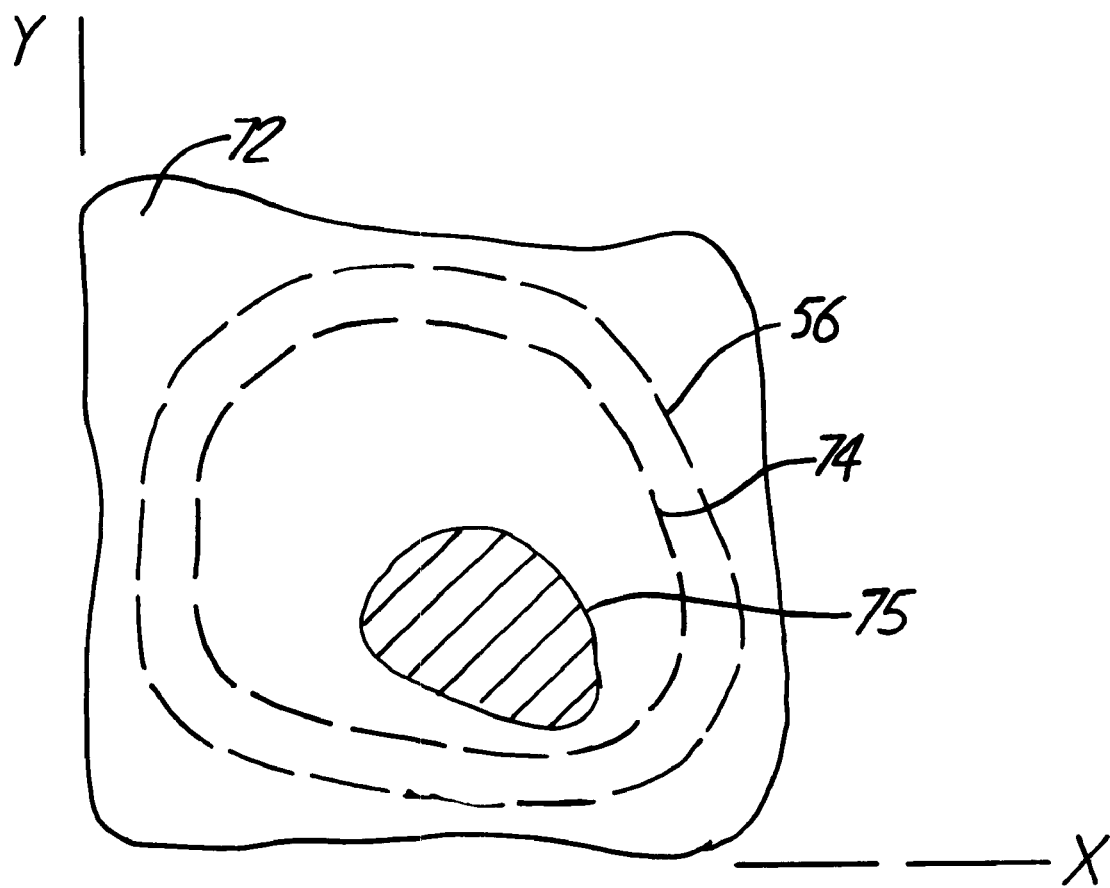
FIG. 2 is an illustration of a weld area including a molten puddle.

Laser beam 70 from laser 58 forms the molten puddle 56 on the workpiece 60. In one embodiment laser is a $CO_2$ laser and the deposited powder is a titanium alloy powder. FIG. 2 is a schematic illustration of a weld area 72 including molten puddle 56. Powder is dispersed from the nozzle 54 into the molten puddle 56 to form powder envelope 74. As previously explained, it is desirable to accurately aim the powder relative to the molten puddle 56 to optimize the metallurgical properties of the deposition welded object. For example, it is desirable to aim powder into a hot spot 75 of the molten puddle 56.

Figure 3:
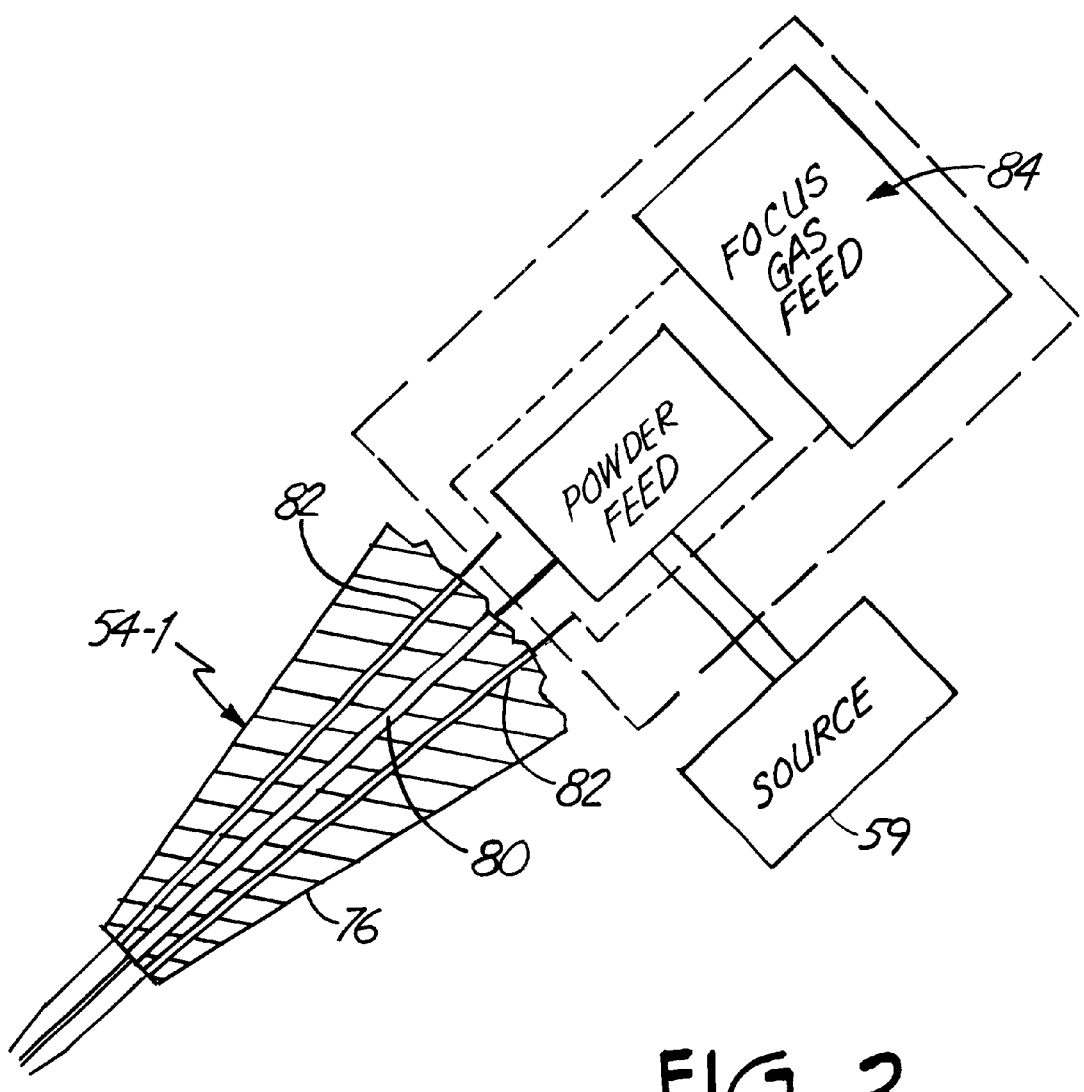
FIG. 3 is an illustration of a tip portion of an embodiment of a powder feed nozzle having gas assisted dispersement.

Various operating parameters affect placement of the powder in the molten puddle 56, including laser parameters, such as alignment and standoff, and nozzle operating parameters such as standoff and powder feed and dispersement parameters as will be described. FIG. 3 illustrates a tip portion 76 of an embodiment of a gas assist powder feed nozzle 54-1. The nozzle 54-1 includes a powder feed channel 80. Powder is fed through channel 80 from source 59 via a gas assist. Nozzle also includes focus gas channels 82. Focus gas is delivered to channels 82 from source 84 to focus or control the profile of powder dispersed from the nozzle 54-1. Thus the profile dimensions and location of the powder envelope 74 is influenced by nozzle operating parameters including gas assist parameters, focus gas parameters as well as standoff of the nozzle tip 76 from the workpiece 60.

During welding operation, operating parameters can shift or vary resulting in variations in powder deposit into the molten puddle 56. The weld area can be visually inspected to assure optimum placement of the deposited powder into the molten puddle 56, however, visual inspection does not provide systematic and automated control. The system of the present invention provides automated feedback of the weld area to control the aim of powder into the molten puddle 56 for enhanced control of the welding process.

Figure 4:
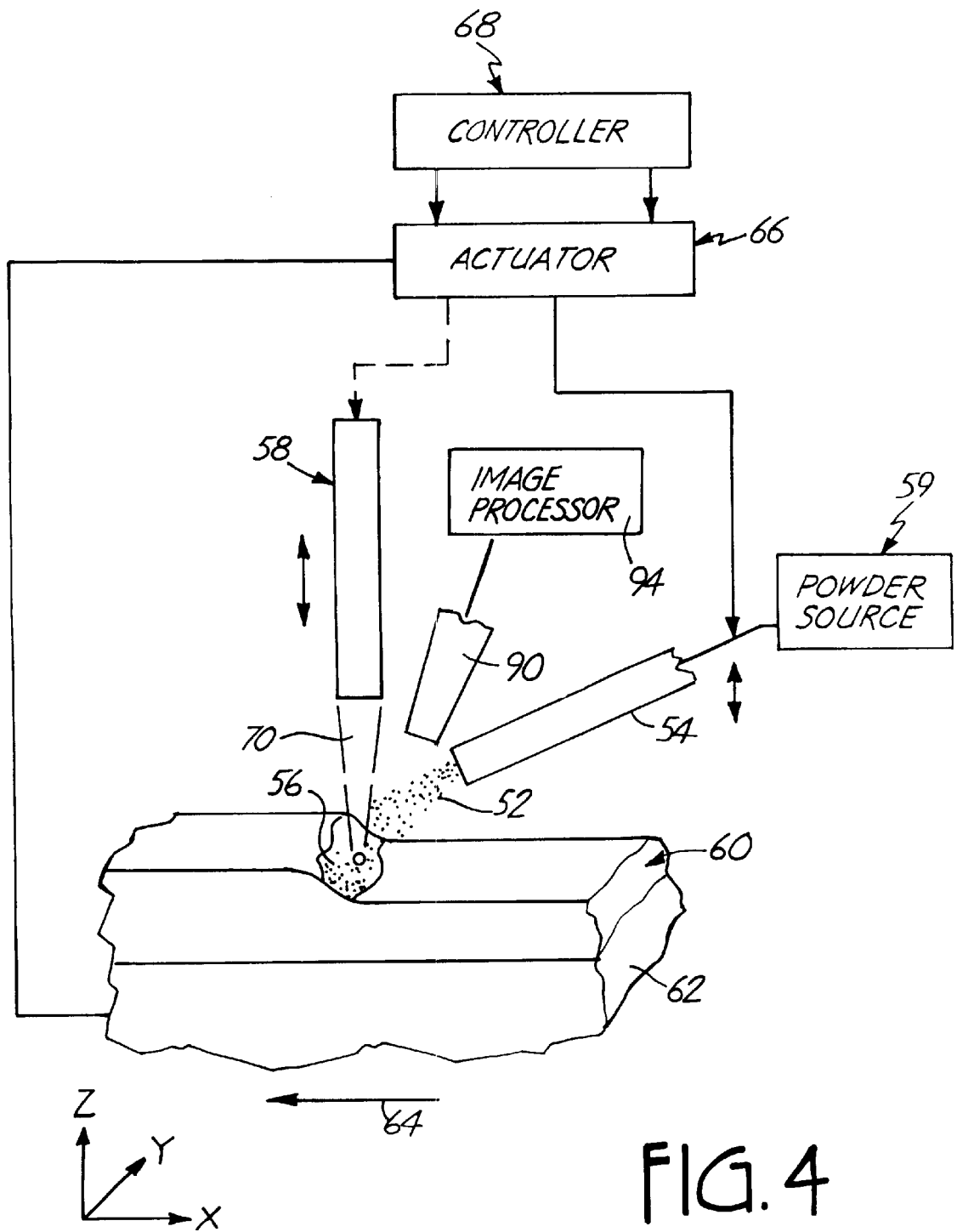
FIG. 4 is a schematic illustration of a deposition welding operation including image feedback for powder aiming.

FIG. 4 illustrates an embodiment of a system of the present invention where like numbers are used to identify like parts in previous FIGS. As shown, an imager 90, such as a digital camera or charged coupled device (CCD) camera is supported to capture a digital image reflected from the weld area 72. The composite image of the weld area 72 is processed by an image processor 94 illustrated diagrammatically to isolate or extract a reflected image of the molten puddle from a reflected background or the workpiece and to extract a reflected image of the deposited powder envelope 74 as will be explained.

Figure 5:
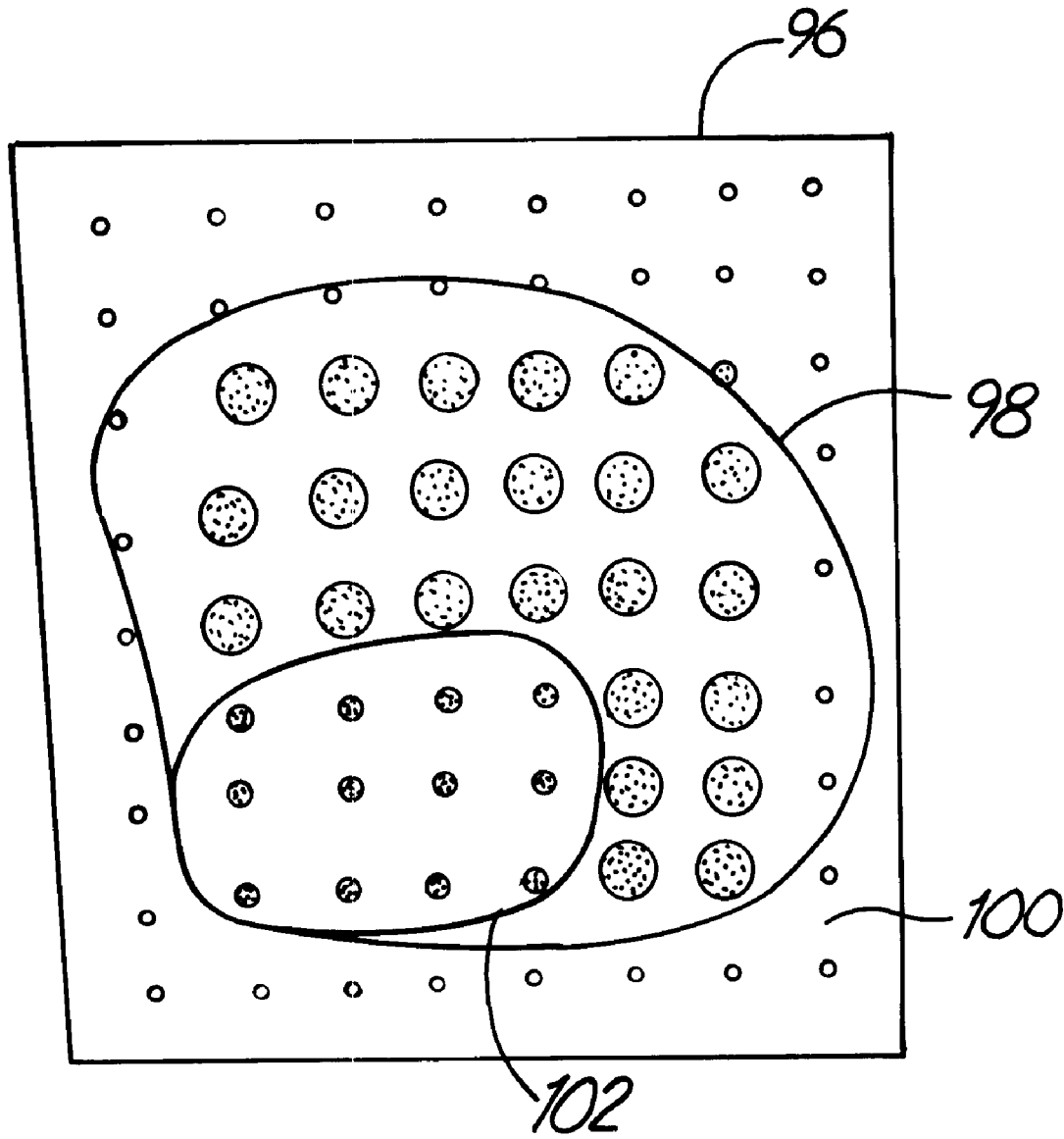
FIG. 5 is a schematic illustration of a digital image of a weld area including a molten puddle.

A reflected digital image 96 of the weld area 72 is schematically shown in FIG. 5. The reflected digital image 96 comprises an array of grey tones or intensities corresponding to the reflection of the imaged weld area 72. The composite reflection of the weld area includes an image of the molten puddle 98, background 100 and powder envelope 102 which have different grey tones or intensities as illustrated schematically in FIG. 5. The processor distinguishes the reflected digital images of the weld puddle 98, background 100 and powder envelope 102 from the composite image based upon different grey tones or intensities of the reflected image of the weld area.

Figure 6:
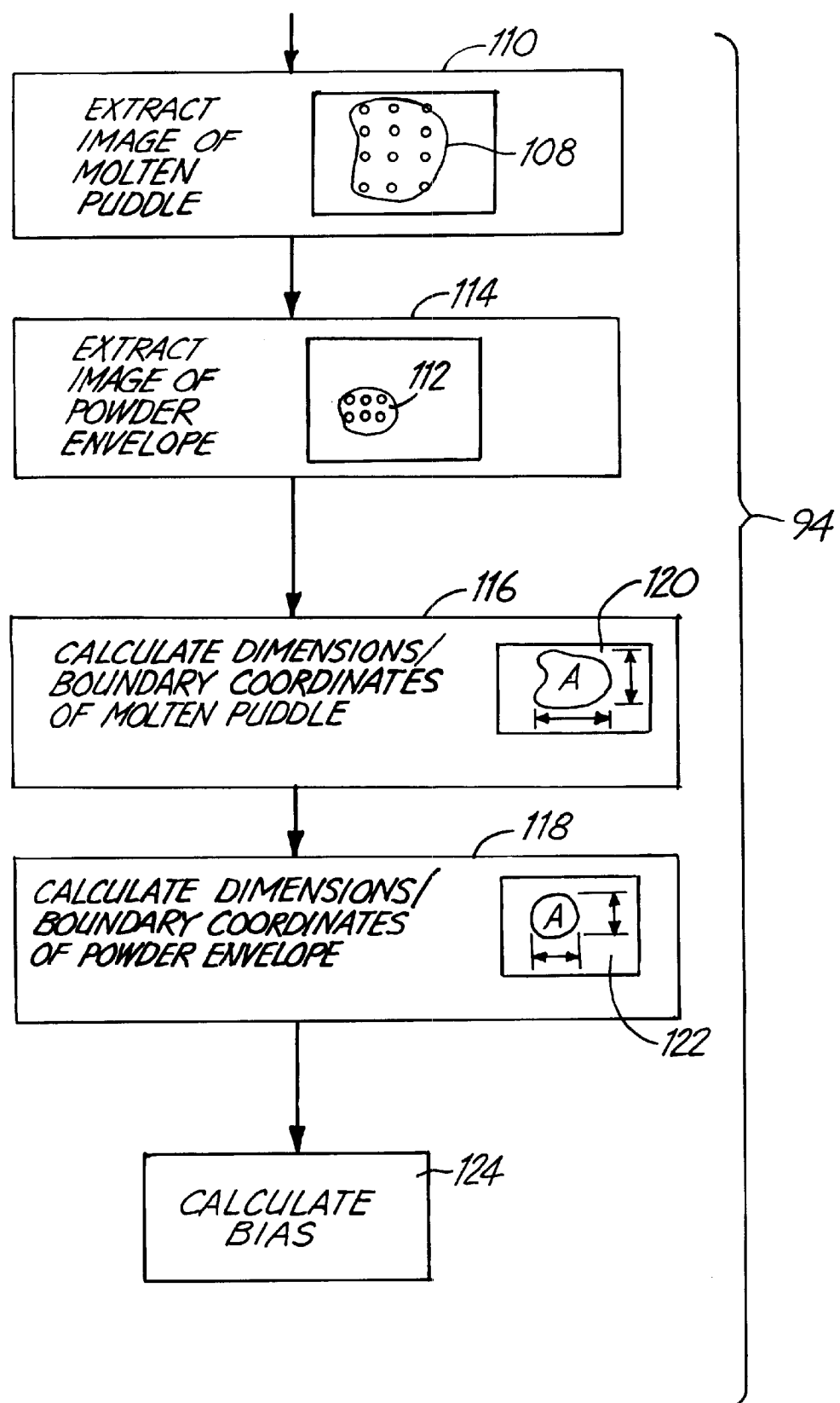
FIG. 6 is a flow chart illustrating an embodiment of image processing operations for a reflected image of the weld area.

As shown in FIG. 6, image processor 94 includes a first image processor configured to extract or isolate a first image 108 as illustrated by block 110 of the molten puddle 98 having a grey tone distinguishable from background 100 and powder envelope 102. The image processor 94 includes a second image processor configured to extract or isolate a second image 112 of the deposited powder or envelope 102 from the molten puddle 98 or background 100 as illustrated by block 114.

The first and second image processors extract the first and second images 108, 112 by filtering the digital image of the weld area 96 to isolate the low intensity background 100 from the hot puddle 98 to extract a processed image of the molten puddle and to extract the reflected powder envelope 102 from the molten puddle 98 to extract a processed image of the powder envelope 102. The digital image 96 can be optically or digitally filtered. The first and second processed images are used to analyze powder aiming into the molten puddle.

The processed images of the molten puddle and powder envelope are used to calculate or determine profile parameters of the molten puddle and powder envelope, such as area dimensions and boundary dimensions or coordinates of the molten puddle and powder envelope, as illustrated by blocks 116, 118 in FIG. 6. In the embodiment shown, the area and boundary coordinates of the molten puddle and powder envelope are measured as shown by illustrations 120, 122. The measured data is used to calculate the position or location of the powder envelope in the molten puddle. In the embodiment shown a bias is calculated as illustrated by block 124 for the imaged position of the powder envelope relative to a reference or predetermined position of the powder envelope. For example, powder aiming may be desired in the hot spot 75 or in the center portion of the molten puddle. Thus, the calculated bias measures the difference between the imaged powder position and the reference or centered powder position.

Figure 7:
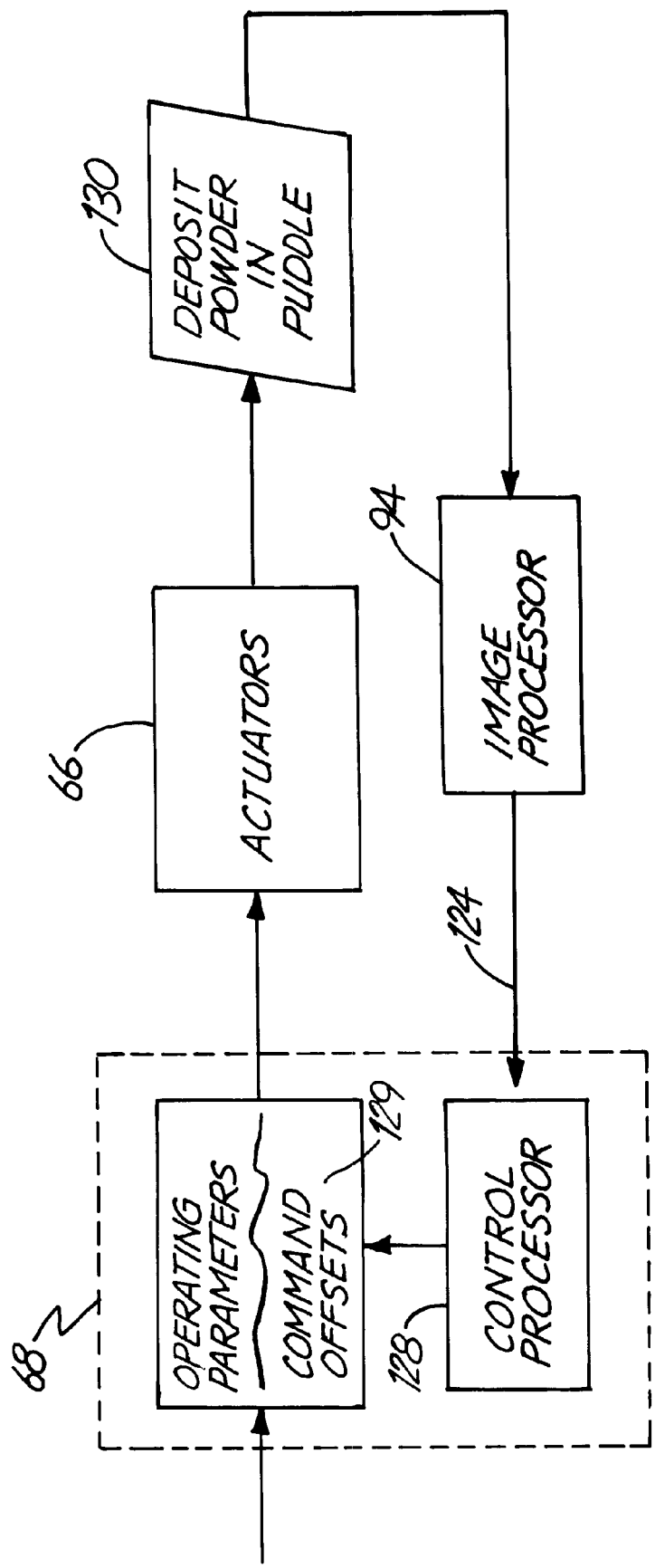
FIG. 7 is a schematic diagram illustrating an embodiment of feedback control for powder aiming based upon a reflected image.

As previously described various operating parameters affect powder aiming. FIG. 7 illustrates feedback control based upon output or a bias 124 from the image processor 94. The image feedback or bias from the image processor 94 is provided to a control processor 128 to calculate an offset command 129 to adjust operating parameters of the actuator 66 operating the laser 58, nozzle 54, and table based upon processed feedback of the molten puddle and powder envelope. Thus the bias calculation is used to calculate the offset command 129 used by the controller 68 to control system actuators 66 illustrated schematically to deposit powder into the molten puddle as illustrated by block 130.

Figure 8:
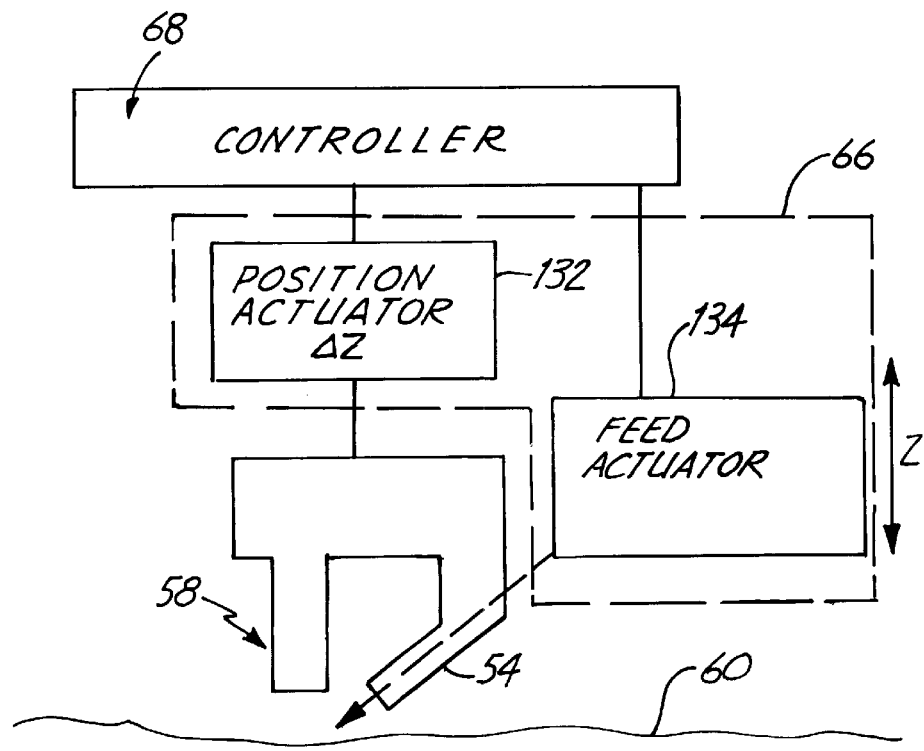
FIGS. 8–9 illustrate alternate embodiments of operating controls for a laser and a feed nozzle of a deposition welding system.
Figure 9:
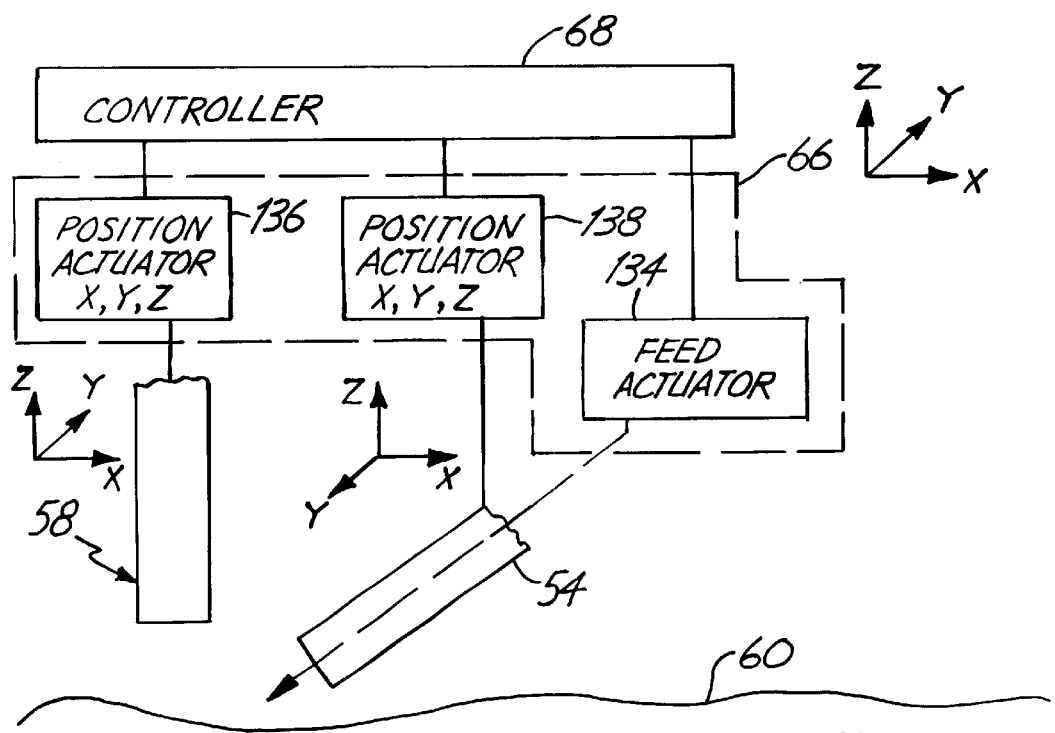
Figure 10:
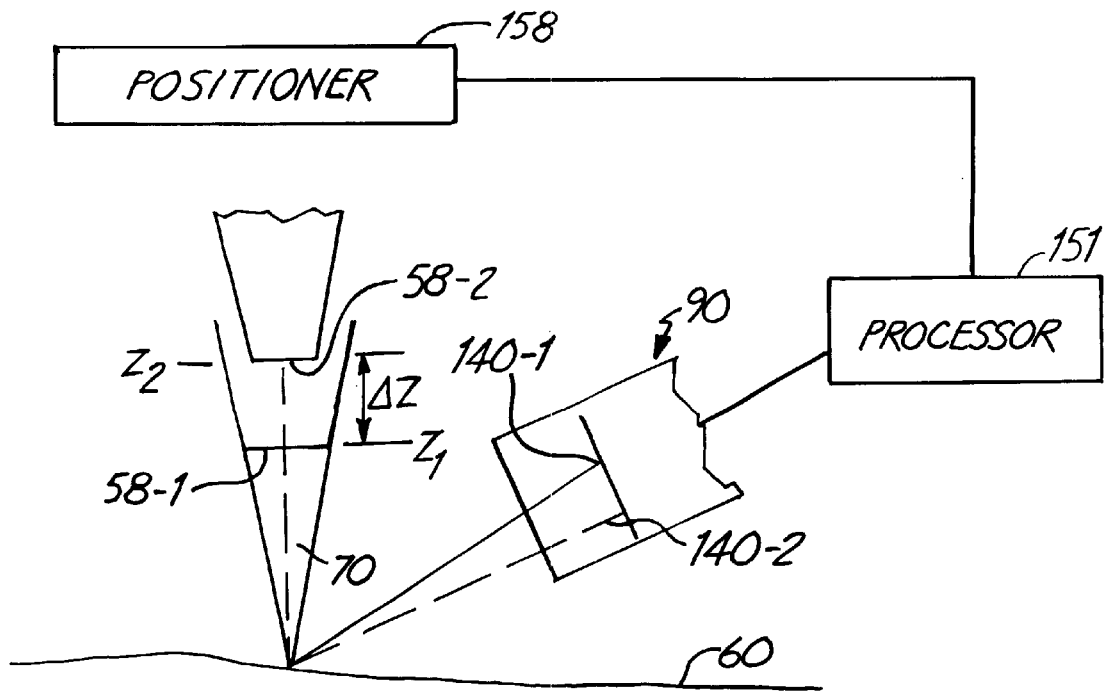
FIG. 10 is a schematic illustration of an embodiment of a standoff or position feedback control system for a laser using a reflected image of the laser beam.

As schematically shown in FIGS. 8–9, the system actuator 66 can include standoff actuator 132 for the laser and nozzle and a powder feed actuator 134 for nozzle. Alternatively, system actuator 66 can include standoff actuator for the laser 136, standoff actuator for the nozzle 138 and powder feed actuator 134 for the nozzle. Application of the image processing for powder aiming of the present invention is not limited to the specific embodiments shown.

As previously described, during operation alignment of the welding components can shift which can affect powder aiming and control of powder deposit to the molten puddle. Correct alignment is necessary for powder aiming. FIGS. 10–13 schematically illustrate a system for measuring standoff or alignment of the laser using a reflected image of the laser itself. Standoff is the distance of the laser from the workpiece 60. As shown in FIG. 1, laser 58 projects laser beam 70 which is reflected off a workpiece surface 60. Imager 90 or CCD camera is orientated toward the workpiece surface 60 to capture the reflected image of the weld area and laser beam 70. As shown, the reflections (140-1, 140-2 from the laser beam of the workpiece shift based upon the standoff elevation of the laser 58-1, 58-2. The position shift of the laser beam reflection 140-1, 140-2 is used to measure the alignment or standoff of the laser from the workpiece surface 60.

Figure 11:
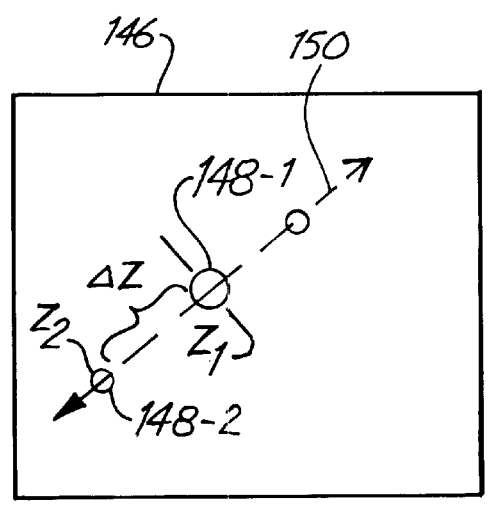
FIG. 11 is a schematic illustration for using a reflected laser image for standoff control.

As shown in FIG. 11, imager 90 captures a two dimensional digital image 146 of a reflection of the weld area. As shown, the reflected image of the laser 58 produces a bright spot 148 which can be isolated or extracted from the digital image based upon the intensity of the bright spot 148 relative to the background. The position of the bright spot 148 in the two dimensional digital image 146 is used to measure the standoff of the laser relative to the workpiece 60. As shown, the position of the bright spots 148-1, 148-2 shifts along axis 150 of the reflected image 146 based upon changes in the standoff distance of the laser 58 from the workpiece. For example as shown, in FIG. 11, the reflected bright spot 148-1 for laser having an elevation or standoff distance $z_1$ is spaced along axis 150 from bright spot 148-2 having a standoff distance $z_2$. Thus the $\Delta z$ (standoff difference $z_2-z_1$) is proportional to the distance between reflections 148-1 and 148-2 on digital image 146.

Figure 12:
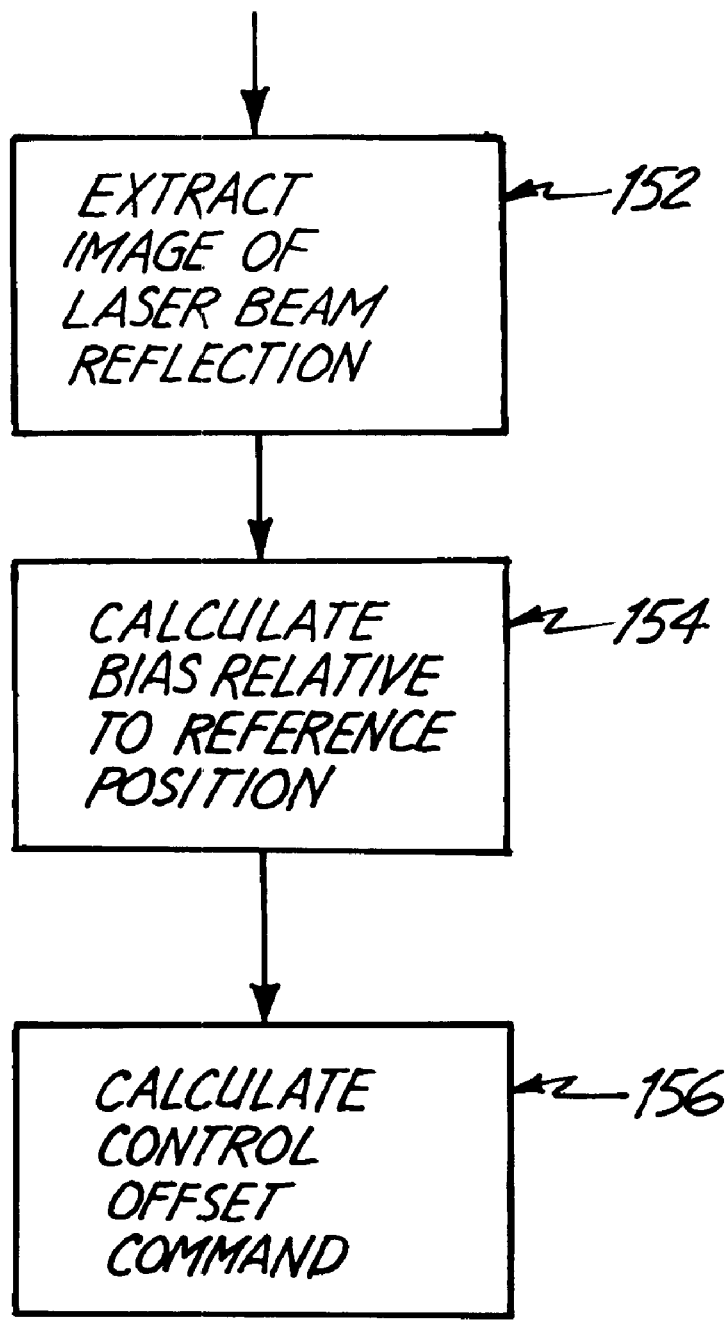
FIG. 12 is a flow chart illustrating an embodiment for image processing operations for alignment or standoff control.

Thus as illustrated in FIG. 12, the digital image 146 is processed or filtered by processor 151 as illustrated by block 152 to extract the reflected bright spot 148 of the laser beam. As previously explained, the image can be optically or digitally filtered to extract the bright spot 148. The position of the bright spot is scaled as illustrated by block 154 relative to a reference standoff distance to provide a bias calculation which is used to calculate an offset command as illustrated by block 156. The calculated offset command is transmitted to positioner or actuator 158 illustrated diagrammatically in FIG. 10 to adjust the standoff position of the laser for desired operating control. Thus, the laser's own reflection can be used for accurate standoff control of the laser to control operating parameters for optimum powder aiming.

Figure 13:
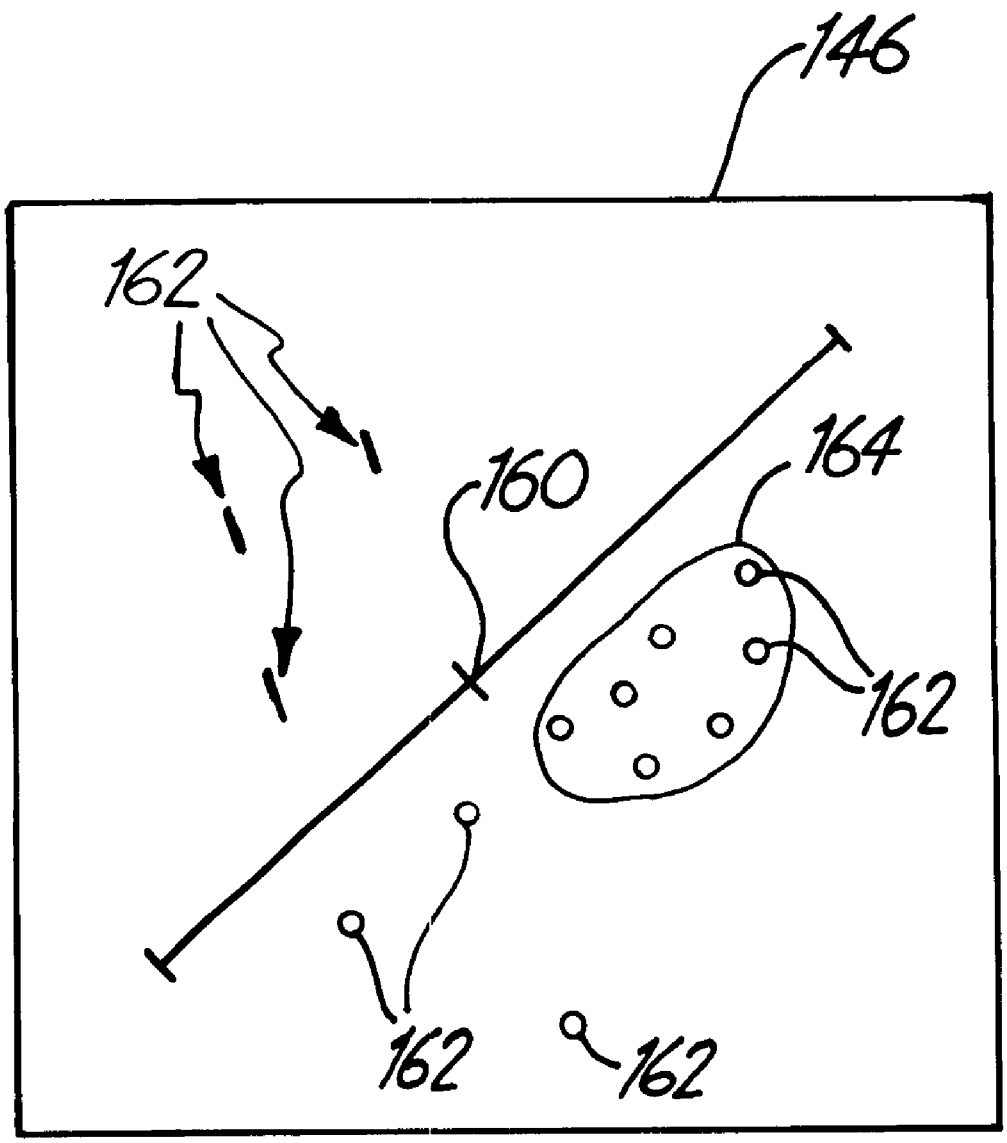
FIG. 13 is a schematic illustration for using a reflected laser image for orientation or alignment control.

The orientation or alignment of the laser relative to the workpiece can also be controlled by the reflected image of the laser as shown in FIG. 13. As shown, the alignment of the laser is controlled relative to a reference datum 160 to control the position of the molten puddle. Shift or changes in the orientation of the laser reflection 140 relative to the reference datum 160 are measured from a reflected digital image 146 of the weld area. As shown in FIG. 13 the digital image 146 includes scattered intensity points 162 due to the dynamic operating environment of the laser welding process. The image is processed to filter intensity points 162 outside set boundary parameters and the remaining points 162 are processed or averaged to control the alignment of the nozzle 58 relative to a defined reference datum.

Image 146 is filtered through a low pass filter to smooth the scattered image points 162 and filtered the image to remove extraneous intensity points 162 with a large sigma or deviation from normalized points 164. The position of the normalized points 164 is calculated or averaged and scaled relative to the reference datum 160 to provide a bias calculation which is used to derive an offset command to adjust alignment of the laser. Thus, as described, a calculated offset command is executed by a laser actuator or positioner having x-y-z control to adjust alignment and standoff of the laser relative to a reference position or datum for operating control.

Although the present invention has been described with reference to preferred embodiments, workers skilled in the art will recognize that changes may be made in form and detail without departing from the spirit and scope of the invention

What is claimed is:

1. A material deposition system comprising:
   an energy source orientated to form a molten puddle on a workpiece;
   a nozzle coupleable to a source of flowable weld material and having a discharge opening orientated to deposit the flowable weld material to the molten puddle;
   an imager orientated to capture an image of a weld area including the molten puddle and the deposited flowable weld material; and
   an image processor coupled to the imager including:
   first image processing to extract a profile of the molten puddle from the image of the weld area; and
   second image processing to extract a profile of the deposited weld material from the image of the weld area.

2. The material deposition system of claim 1 wherein the first image processing calculates profile coordinates for the molten puddle.

3. The material deposition system of claim 2 wherein the second image processing calculates profile coordinates for the deposited weld material.

4. The material deposition system of claim 3 wherein the image processor calculates a bias based upon the profile of the weld material relative to the profile of the molten puddle.

5. The material deposition system of claim 4 and further comprising a control processor configured to calculate a control command based upon the calculated bias.

6. The material deposition system of claim 5 wherein the control command adjusts a standoff operating parameter of the energy source or the nozzle relative to the workpiece.

7. The material deposition system of claim 5 wherein the control command adjusts feed rate or dispersement parameters of the weld material.

8. The material deposition system of claim 1 wherein the energy source is a laser.

9. A material deposition system comprising:
   a laser to form a molten puddle on a weld area of a workpiece;
   an imager orientated to capture an image of the weld area on the workpiece; and
   a processor coupled to the imager and configured to process the image of the weld area to isolate a profile of the molten puddle and calculate a scaled position of the molten puddle relative to a datum.

10. The material deposition system of claim 9 wherein the scaled position of the molten puddle relative to the datum is used for standoff control.

11. The material deposition system of claim 9 wherein the processor calculates a scaled orientation of the molten puddle relative to the datum to control orientation of the laser.

12. The material deposition system of claim 9 wherein the processor calculates a stand-off bias between the scaled position of the molten puddle and the datum.

13. The material deposition system of claim 12 wherein an offset command is calculated based upon the calculated standoff bias to adjust standoff.

14. The material deposition system of claim 9 wherein the processor calculates a scaled standoff and orientation of the molten puddle relative to the datum.

15. The material deposition system of claim 11 wherein the processor calculates a bias based the scaled orientation of the molten puddle relative to the datum.

16. The material deposition system of claim 15 wherein an offset command is calculated based upon the calculated bias to adjust alignment of the laser.

17. A method for welding control comprising steps of:
   heating a workpiece to form a molten puddle in a welding area;
   depositing a weld material to the molten puddle in the welding area;
   imaging the welding area; and
   processing an image of the welding area to extract a profile of the molten puddle and a profile of the deposited weld material.

18. A method of welding control comprising steps of:

heating a workpiece to form a molten puddle in a welding area;

depositing a weld material to the molten puddle;

imaging the welding area;

processing an image of the welding area to extract a profile of the molten puddle; and calculating a bias of a position of the molten puddle relative to a reference datum.

19. The method of claim 18 and further comprising a step of:

adjusting operating parameters relative to the calculated bias to adjust the position of the molten puddle relative to the reference datum.

20. The method of claim 19 wherein the step of adjusting the operating parameters includes adjusting at least one of a laser position for heating the workpiece, nozzle position for depositing the weld material, or feed parameters of the weld material.

21. An imaging system for welding applications comprising:

an imager;

an image processor to extract a molten profile from an image and calculate a scaled position of the molten profile relative to a datum.

22. The imager of claim 21 wherein the image processor calculates a bias between the scaled position of the molten profile and the datum.

23. The image of claim 21 wherein the processor calculates a standoff bias and an orientation bias relative to the datum.

24. An imaging system for welding applications comprising:

an imager and an image processor configured to extract a profile of a molten puddle from an image and a profile of deposited weld material from the image and calculate a bias between the profile of the deposited weld material and the profile of the molten puddle.

25. The method of claim 17 and further comprising the step of:

calculating a bias between the profile of the deposited weld material relative to the profile of the molten puddle.

26. An article formed using the method of claim 17.

27. An article formed using the method of claim 18.

* * * * *